(12) United States Patent
Allstrom et al.

(10) Patent No.: US 8,776,019 B2
(45) Date of Patent: Jul. 8, 2014

(54) CONFIGURATOR WITH EMBEDDED FIRMWARE FOR OFFLINE INSTRUMENT USER SETTINGS IMPLEMENTATION

(75) Inventors: Peter E. Allstrom, Foxboro, MA (US); Spencer K. Howe, Scituate, MA (US)

(73) Assignee: Invensys Systems, Inc., Foxboro, MA (US)

( * ) Notice: Subject to any disclaimer, the term of this patent is extended or adjusted under 35 U.S.C. 154(b) by 965 days.

(21) Appl. No.: 12/329,234

(22) Filed: Dec. 5, 2008

(65) Prior Publication Data

US 2010/0145671 A1    Jun. 10, 2010

(51) Int. Cl.
*G06F 9/44* (2006.01)
(52) U.S. Cl.
USPC ............................................ 717/120; 703/21
(58) Field of Classification Search
USPC ......................................................... 717/120
See application file for complete search history.

(56) References Cited

U.S. PATENT DOCUMENTS

| | | | |
|---|---|---|---|
| 5,287,514 A * | 2/1994 | Gram ............................. | 715/826 |
| 6,058,492 A | 5/2000 | Sample et al. | |
| 6,230,307 B1 | 5/2001 | Davis et al. | |
| 6,272,452 B1 | 8/2001 | Wu et al. | |
| 6,295,518 B1 | 9/2001 | McLain et al. | |
| 6,311,149 B1 | 10/2001 | Ryan et al. | |
| 6,529,847 B2 * | 3/2003 | Hamilton et al. ............. | 702/127 |
| 6,564,179 B1 | 5/2003 | Belhaj | |
| 6,584,601 B1 | 6/2003 | Kodosky et al. | |
| 6,643,843 B1 * | 11/2003 | Reger ............................ | 717/168 |
| 6,834,359 B2 | 12/2004 | Boehm et al. | |
| 6,975,981 B1 | 12/2005 | Soloviev | |
| 6,983,227 B1 | 1/2006 | Thalhammer-Reyero | |
| 7,047,172 B1 | 5/2006 | Usami et al. | |
| 7,076,740 B2 | 7/2006 | Santori et al. | |
| 7,136,800 B1 | 11/2006 | Vega | |
| 7,143,023 B2 | 11/2006 | Katz et al. | |
| 7,152,027 B2 | 12/2006 | Andrade et al. | |
| 7,167,820 B2 | 1/2007 | Sarfati et al. | |
| 7,181,385 B2 | 2/2007 | Ganzert | |
| 7,188,062 B1 | 3/2007 | Rieschl et al. | |
| 7,318,151 B1 | 1/2008 | Harris | |
| 2002/0049576 A1 | 4/2002 | Meyer | |
| 2002/0055834 A1 | 5/2002 | Andrade et al. | |
| 2002/0059054 A1 | 5/2002 | Bade et al. | |
| 2002/0065631 A1 * | 5/2002 | Loechner ....................... | 702/188 |
| 2004/0015952 A1 * | 1/2004 | Lajoie et al. .................. | 717/171 |
| 2004/0068548 A1 | 4/2004 | Sugita | |
| 2004/0203434 A1 | 10/2004 | Karschnia et al. | |
| 2004/0215440 A1 | 10/2004 | Crowell | |
| 2006/0100807 A1 * | 5/2006 | Koukol et al. ................. | 702/88 |
| 2006/0173662 A1 | 8/2006 | Kazama et al. | |
| 2006/0184344 A1 | 8/2006 | Heo | |
| 2006/0230394 A1 | 10/2006 | Forth et al. | |
| 2006/0256366 A1 * | 11/2006 | Ferlitsch ....................... | 358/1.15 |

(Continued)

*Primary Examiner* — Don Wong
*Assistant Examiner* — Theodore Hebert
(74) *Attorney, Agent, or Firm* — Edward S. Jarmolowicz, Esq.

(57) ABSTRACT

A system for the customization of user settings on a target instrument includes a configuration module configured for the customization of user settings on a target instrument, and a representation module communicably coupled to the configuration module. The representation module includes a duplicate of firmware from the target instrument. A method of production of a system for the customization of user settings on a target instrument, includes configuring a configuration module for the customization of user settings on a target instrument, communicably coupling the configuration module to a representation module; and disposing a duplicate of firmware from the target instrument in the representation module.

22 Claims, 7 Drawing Sheets

(56) References Cited

U.S. PATENT DOCUMENTS

| | | | |
|---|---|---|---|
| 2008/0125917 A1* | 5/2008 | Walker et al. | 700/284 |
| 2008/0141170 A1* | 6/2008 | Kodosky et al. | 715/810 |
| 2009/0125896 A1* | 5/2009 | Chessell et al. | 717/168 |
| 2010/0095292 A1* | 4/2010 | Kohl | 717/173 |

* cited by examiner

CONFIGURATOR WITH EMBEDDED FIRMWARE FOR OFFLINE INSTRUMENT USER SETTINGS IMPLEMENTATION

BACKGROUND

1. Technical Field

This invention relates to the configuration of an instrument in a process control system, and more particularly to a computer-based configuration program for configuring user settings of such an instrument.

2. Background Information

Instruments used in process control (e.g., factory automation) systems, such as transmitters and other field devices, typically require customization for the specific needs of the system. Some instruments may be configured directly through an instrument's user interface, such as a front panel display and keyboard. However, as transmitters and the like have become increasingly sophisticated, it has become increasing cumbersome to effect a complete configuration solely using the instrument's interface. Moreover, these relatively simple user interfaces may not be capable of adequately displaying all of the numerous combinations of options once they are configured. Still further, the physical locations of the various field devices, e.g., on factory floors or other industrial environments, often present sub-optimal conditions for effecting what may amount to relatively complex programming operations.

To address these concerns, computer-based (e.g., PC-based) configuration programs have been developed, with which relatively complicated instrument customizations may be performed, and then downloaded to the instrument. These configuration programs are provided with a set of configuration rules (e.g., "business logic") which include various configuration options available for particular instruments. The configuration programs use these configuration rules to present the various configuration options to the user for selection, to determine whether the particular options selected by the user are consistent with the configuration rules, and to then generate user settings based on the selections.

These configuration programs run on a configurator platform, such as a Windows™ platform, and typically can not be run on a different target instrument platform. In addition, the generated user settings may not precisely match the functionality of the target instrument. They also run the risk of not being kept up to date with changes made to the instrument. As such, the user settings initially generated by these configuration programs are often not ready for immediate implementation on the instrument. Rather, these preliminary user settings must typically be downloaded to the instrument, and then adapted for consistency with the instrument. Such use of these configuration programs thus effectively requires the user settings to be configured twice, once for the configuration program platform, and again for the instrument platform.

This conventional multi-step configuration approach is shown in FIG. 1, which includes configuring user options for a target instrument in a configurator on a Windows™ platform at 21; and transmitting the configured user settings to the target instrument at 23. After the user settings have been transmitted to the target instrument, the configuration settings are adapted, or re-configured, for the target instrument platform at 25.

It will be recognized that this adaptation 25 represents additional time and effort beyond that associated with the initial configuration 21. Also, problems with the selected user options, such as incompatibilities, etc., with the particular version of the instrument in use, may not become apparent until after the user settings have been downloaded into the instrument. This relatively late awareness of configuration issues may be particularly problematic, as it may constitute an unanticipated delay in bringing the process on-line after a shut-down. Moreover, these issues often require correction in the field, with the configuration computer physically plugged into the instrument, i.e., under the often sub-optimal conditions discussed above.

Thus, a need exists for a "dual platform" configuration program that enables accurate customization of a target instrument on a configurator platform, independently of the target, so that completed configuration settings may be downloaded to an instrument with a different platform, substantially without the need for further adjustment.

SUMMARY

In one aspect of the invention, a system for the customization of user settings on a target instrument includes a configuration module running on a platform, and a representation module running on a platform. The representation module is communicably coupled to the configuration module. The representation module includes a firmware duplicate, which comprises at least a portion of firmware of the target instrument. The representation module is configured to transform the firmware duplicate into a representation of at least a portion of a physical target instrument. The system is configured to generate a customized set of user settings for the target instrument running on a second platform.

In another aspect of the invention, a system for the customization of user settings on a target instrument in a process control system, includes a configuration module running on a platform, and a representation module running on a platform. The representation module is communicably coupled to the configuration module. The representation module includes a firmware duplicate including at least a portion of firmware from the target instrument. The representation module is configured to transform the firmware duplicate into a representation of at least a portion of a physical target instrument. The firmware is compliant with communication protocols selected from the group consisting of HART®, FOXCOM®, PROFIBUS™, FOUNDATION™ FIELDBUS, MODBUS® (Schneider Automation Inc., North Andover Mass.), RS232, RS 485, DEVICENET™, CONTROLNET™, CAN™, ZIG-BEE™ (IEEE 802.15.4), Ethernet/IP, DH+, Intranet, and combinations thereof. This aspect also includes a menu module configured to generate prototypes of a user menu for the target instrument. This aspect also includes a diagnostics module configured to perform an operation selected from the group consisting of: confirming proper operation of said configuration module; confirming proper configuration of the customized set of user settings; and confirming proper configuration of a menu prototype for the target instrument, and combinations thereof. The system is configured to generate a customized set of user settings for the target instrument running on a second platform, independently of any connection to the target instrument, which user settings are capable of being used by the target instrument without further modification.

In yet another aspect of the invention, a method of customizing user settings on a target instrument includes providing a configuration module for customizing user settings on a target instrument; providing a representation module with a duplicate of firmware of the target instrument; communicably coupling the representation module to the configuration module; and actuating the configuration and representation modules to generate a customized set of user settings for the target instrument.

In yet another aspect of the invention, a system for the customization of user settings on a target instrument, includes first computer readable code on computer readable media, the first code configured for customizing user settings on a target instrument; and second computer readable code on computer readable media, said second code including firmware of the target instrument. The system is configured to generate a customized set of user settings for the target instrument.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
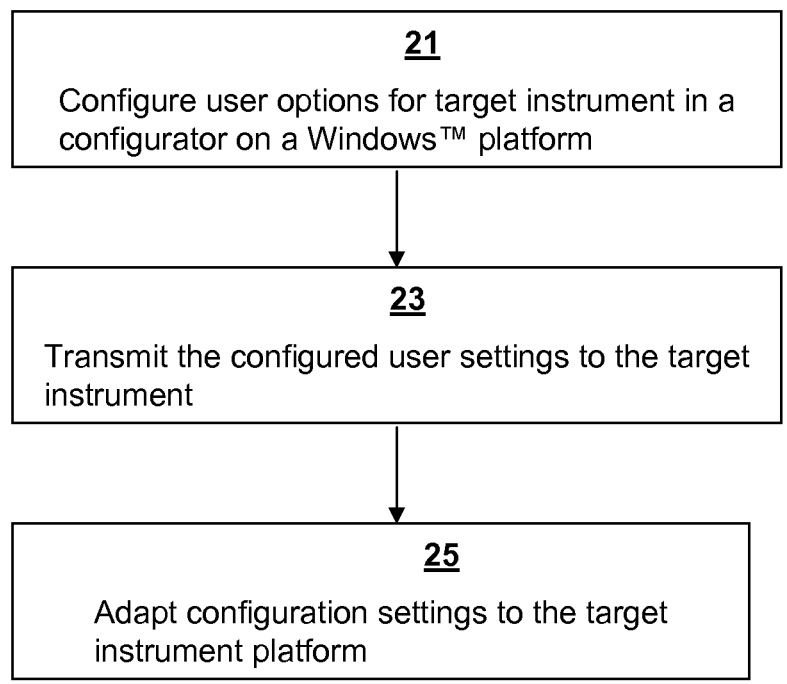
FIG. 1 is a block diagram of a prior art method.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Where used in this disclosure, the term "computer" is meant to encompass a workstation, personal computer (PC), personal digital assistant (PDA), smart phone, cellular telephone, or any other suitable computing device having a processor, a computer readable medium upon which computer readable program code may be disposed, and a user interface. The term "platform" refers to a foundation technology of a machine, such as a hardware layer or an operating system. The term "firmware" refers to software routines (e.g., code) and/or tables stored in non-volatile memory of an instrument to nominally prevent modification of the software routines during normal operation of the instrument. The term "firmware duplicate" refers to a copy of some firmware from the target instrument, and may include additional code and/or tables. The term "memory" includes any computer readable media, such as RAM (random access memory), ROM (read only memory), flash memory, other non-volatile memory, and portable data storage devices, etc. The term "self-checking code" includes code configured so that invalid instructions may be uncovered.

Briefly, embodiments of the invention include a "dual platform" configuration system, which includes a configuration module running on a first platform. This system is configured for the generation of customized user settings for a target instrument running on a second platform. These customized user settings may be directly implemented on the target instrument, substantially without further adjustment. The configuration module is coupled to a representation module, as described below. The configuration module may operate as if it were connected to the target instrument, while running on a stand-alone computer.

Embodiments of the invention include a configurator 100 having a configuration module 102 which presents to a user (e.g., via the graphical user interface of a host computer on which configurator is running) various configuration options for a particular target instrument. Module 102 is communicatively coupled to a representation module 104 which includes a firmware duplicate 106 of the target instrument. The representation module 104 is configured to transform the firmware duplicate into a representation of at least a portion of a physical target instrument.

In particular embodiments of the invention, the firmware duplicate 106 includes at least about fifty percent (50%) of the target instrument firmware. In many embodiments, the firmware duplicate includes about eighty to ninety percent (80-90%) of the target instrument firmware. In these embodiments, the remaining code of the firmware duplicate includes hardware adaptation code. This hardware adaptation code includes instructions configured for adapting the firmware duplicate to the specific hardware requirements of the host computer on which the configuration module is running, to the extent they differ from those of the target instrument.

In one example, the hardware adaptation code is configured to manage variations in hardware platforms. In particular embodiments, data size and types are defined to minimize variations due to differences in hardware platforms, such as 8 bit versus 16 bit versus 32 bit platforms, etc., and due to hardware differences in peripheral devices. This hardware adaptation code thus may address different coding needs for different physical user interfaces, such as different types of display screens, and different types of input devices, such as a mouse or a keyboard.

In particular exemplary embodiments, the hardware adaption code may include conditional inclusive preprocessor directives, which enable the execution of alternate code for different platforms. The conditional preprocessor directives cause alternate code to be used for the different platforms. For example, the #if directive may be used to substitute code depending on whether the configuration program is run on the configurator platform (e.g. an Intel® processor running Win32® operating system) or the target instrument platform. These preprocessor directives thus enable the configuration program output to be run on both the configurator platform and the instrument platform.

For example, in the event the target instrument is a transmitter, firmware 106 includes a firmware duplicate including a portion of the transmitter firmware. For ease of explanation, modules 102 and 104 are shown and described as distinct components, however, it should be recognized that the representation module 104 may be embedded within the configuration module, without departing from the scope of the present invention.

The configurator and representation modules are configured to run on an off-line computer, with the firmware duplicate 106 allowing the system to operate as if it were communicably coupled to an actual target instrument. As mentioned above, representation module 104 is configured to transform firmware duplicate 106 into a representation of at least a portion of the physical target instrument. In this manner, system 100 is capable of generating complete, and accurate, configuration settings for a particular target instrument independently of any connection to the target. System 100 may be coupled to the target instrument 110, e.g., after the user settings 108 have been generated, to download the settings 108 to the target instrument 110.

The use of the firmware duplicate 106, rather than an abstract hardware description, allows a complete set of user settings 108 to be made accurately, since from a software standpoint, the representation of at least a portion of the target instrument, e.g., an embedded "pseudo-instrument" is nominally identical to the actual (physical) instrument. Also, use of the actual target firmware eliminates the need to produce a redundant set of configuration rules ("business logic") as discussed above. In addition, this use of the actual instrument firmware enables system 100 to be updated synchronously with the actual instruments, i.e., using the same firmware updates provided for the instruments. This eliminates the need to separately create an update for the configuration rules each time the instrument firmware is updated. For these reasons, the generated user settings 108 are suitable for downloading and implementation onto target instrument 110 without further adjustment.

As mentioned above, system 100 may be run on a computer independently of the target. Advantageously, compilation of the configuration program may typically be faster on a separate computer than on the instrument itself. Use of an independent computer, such as the configurator platform may thus expedite development time and provide convenience. In addition, the configurator platform may compile more quickly than the instrument platform.

It should be noted that such independence may include running the system 100 on a computer that is not connected to the target, or alternatively, running system 100 on a computer, such as workstation, coupled to the process control network. In this latter event, the user settings 108 may be generated without communicating with the target, and upon completion, downloaded via the network to the target device. This independence allows user settings 108 to be generated even before the target instrument is available. It also allows a user to test various configurations of user settings for consistency with that instrument, before downloading the settings to the actual device.

In particular embodiments, the firmware is compliant with any one or more of various communication protocols. Examples of such communication protocols include HART®, FOXCOM®, PROFIBUS™, FOUNDATION™ FIELDBUS, and MODBUS® (Schneider Automation Inc., North Andover Mass.), RS232, RS 485, DEVICENET™, CONTROLNET™, CAN™, ZIGBEE™ (IEEE 802.15.4), Ethernet/IP, DH+, Intranet, and combinations thereof. Configurator 100 may include the Model PCMV Configurator commercially available from Invensys Systems, Inc., modified in accordance with the teachings of the present invention, e.g., to include the firmware 106 of any number of instruments. The Model PCMV Configurator is a Windows-based software package for use with the Invensys™ Model I/A Series™ Transmitters (Invensys Systems, Inc., Foxboro, Mass.). It displays measurements and has calibration and configuration capability for these transmitters. It also utilizes a fluid properties table and primary device parameters to calculate flow rate and process density with the IMV30 transmitter. A modem compatible with the particular communication protocol is typically used for communication with the transmitter.

The target instrument may be any number of field devices commonly used in process control or factory automation systems. For example, the target instrument may include a field device such as a single variable or multi-variable transmitter, such as those available from Invensys Systems, Inc. (Foxboro, Mass.). Particular examples of suitable transmitters include the Invensys™ Model M84, and the Model IMT96 transmitters. The firmware 106 may thus include a duplicate of the firmware of these transmitters.

It should be noted that the various embodiments of the present invention are distinct from conventional in-circuit emulators, which are hardware devices. Rather, the systems of the present invention do not require any hardware other than the computer on which it is configured to run, and a communication link (e.g., wired or wireless) for downloading the completed configuration settings to the target device. The instant embodiments are also distinct from conventional software emulators, which attempt to replicate the functions of a particular target instrument in a manner which enables software intended for execution thereon, to be monitored, e.g., for precompiler diagnostics activities. These traditional emulators do not typically include firmware of a non-connected hardware device. Moreover, emulators are typically connected to the target instrument. In contrast, as discussed hereinabove, the present invention may be used entirely within the operating system of the host computer, without requiring the target instrument to be attached.

These embodiments are also distinct from conventional simulators, which represent the functions of a particular machine, using another machine. These virtual machines, and other simulators, typically rely on hardware descriptions that may not be entirely accurate representations of the particular device being simulated. For example, a typical simulator may use Windows™ code to interpret/represent what the assembly language of the target instrument would do. In contrast, as mentioned above, rather than simply representing the functions of a target instrument such as a transmitter, embodiments of this invention use much of the actual firmware of the target device. Embodiments of this invention may additionally simulate the physical instrument of the target instrument, for use in a configurator interface.

Also, simulators typically do not include user interfaces. As such, one generally would not ship a conventional simulator to a customer to demonstrate a prototype. In contrast, embodiments of the present invention are provided with user interfaces which are similar in form and function to the user interface of the target instrument. For example, as discussed hereinbelow with respect to FIGS. 7A and 7B, an embodiment of the invention may represent physical buttons of the target instrument as virtual buttons on the screen of host computer.

Figure 3:
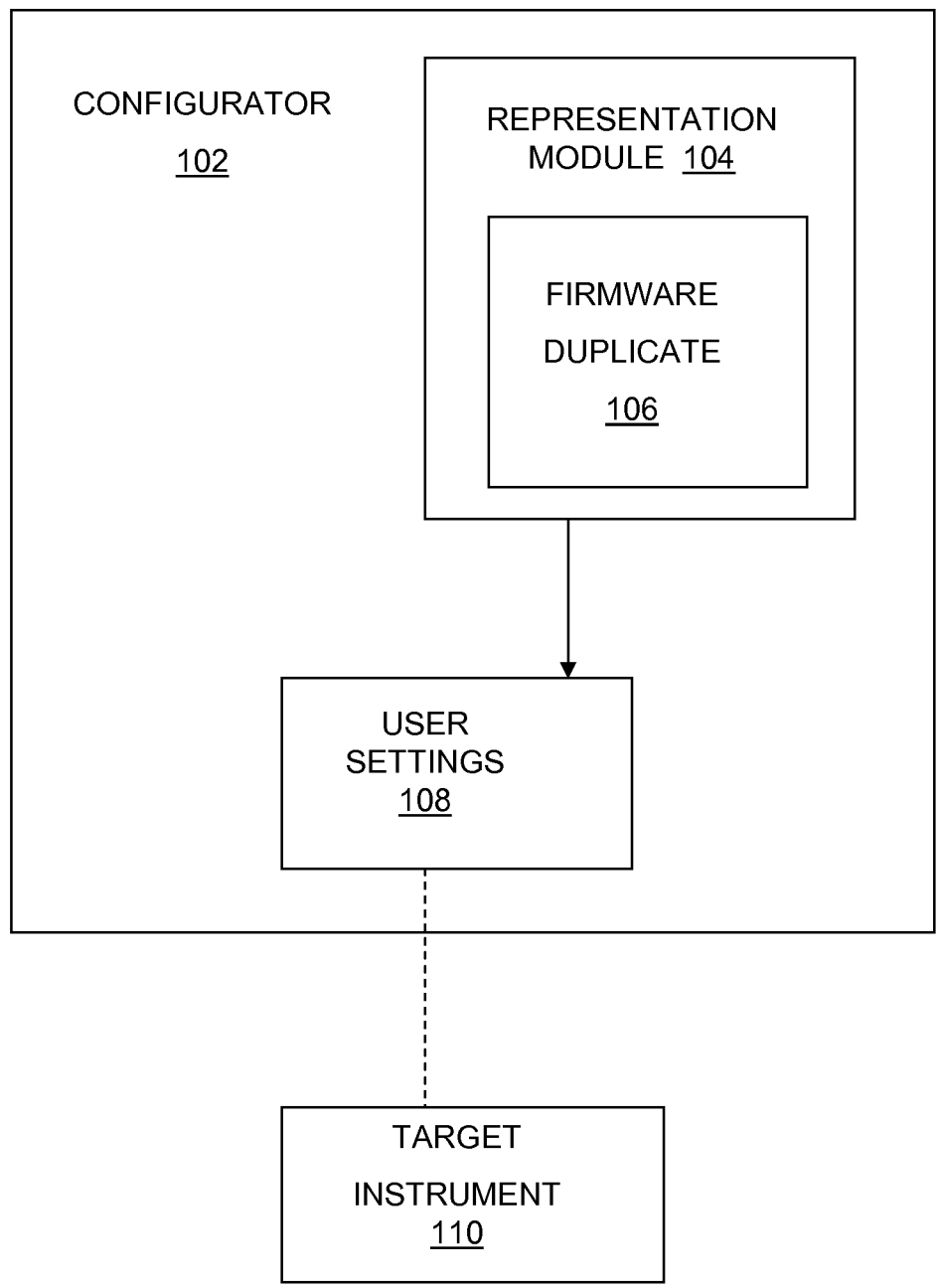
FIG. 3 is a block diagram of a system associated with an embodiment of the present invention.

An alternate embodiment, shown as system 200 in FIG. 3, is substantially similar to system 100, except that representation module 104, including firmware duplicate 106, is embedded within the configuration module 102. As in system 100, the provision of firmware duplicate 106, rather than an abstract hardware description, enables configuration module 102 to conveniently generate an accurate set of user settings 108, without the need for a separate set of configuration rules.

Figure 4:
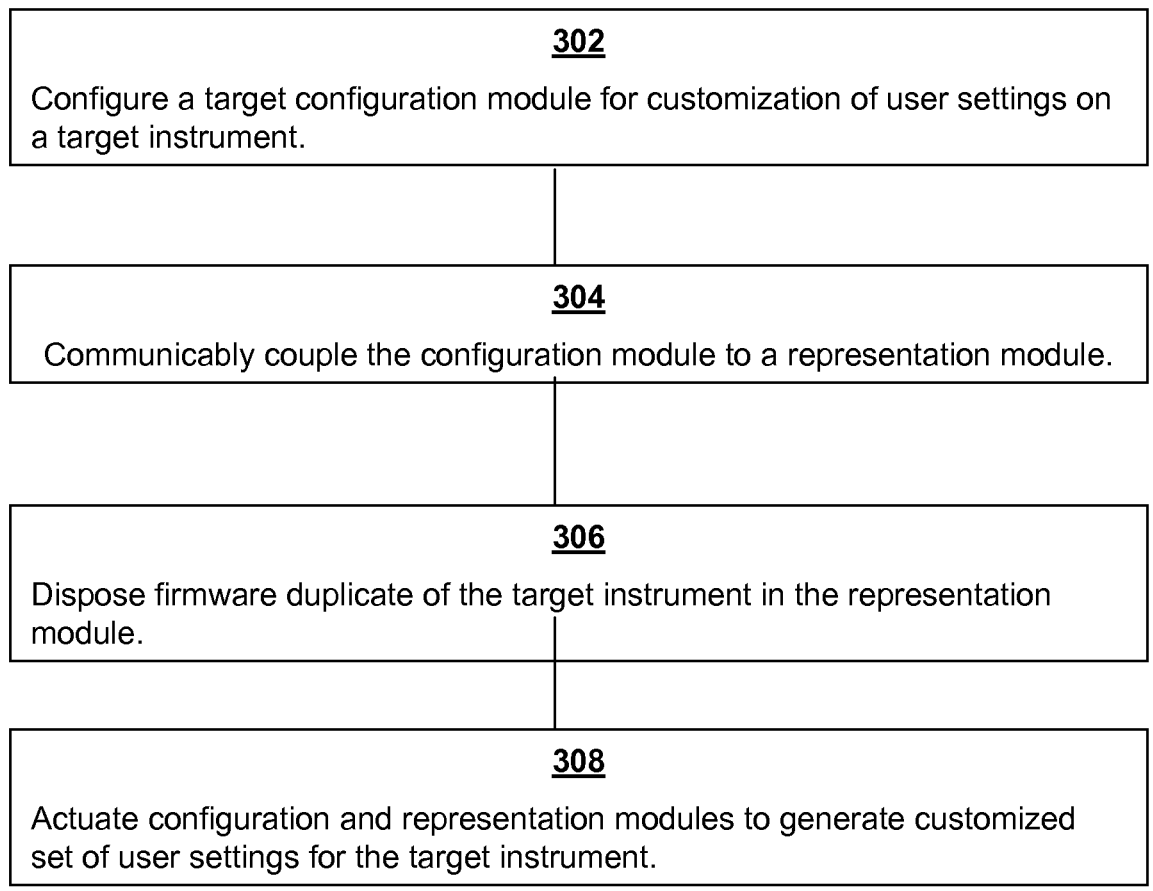
FIG. 4 is a diagram of a method associated with an embodiment of the present invention.

Turning now to FIG. 4, method 300 in accordance with the present invention includes configuring 302 a target configuration module for the customization of user settings on a target instrument; communicably coupling 304 the configuration module to a representation module 304; and disposing 306 a duplicate of firmware of a predetermined target instrument in the representation module 306. The configuration and representation modules are actuated at 308 to generate a customized set of user settings for the target instrument.

Figure 5:
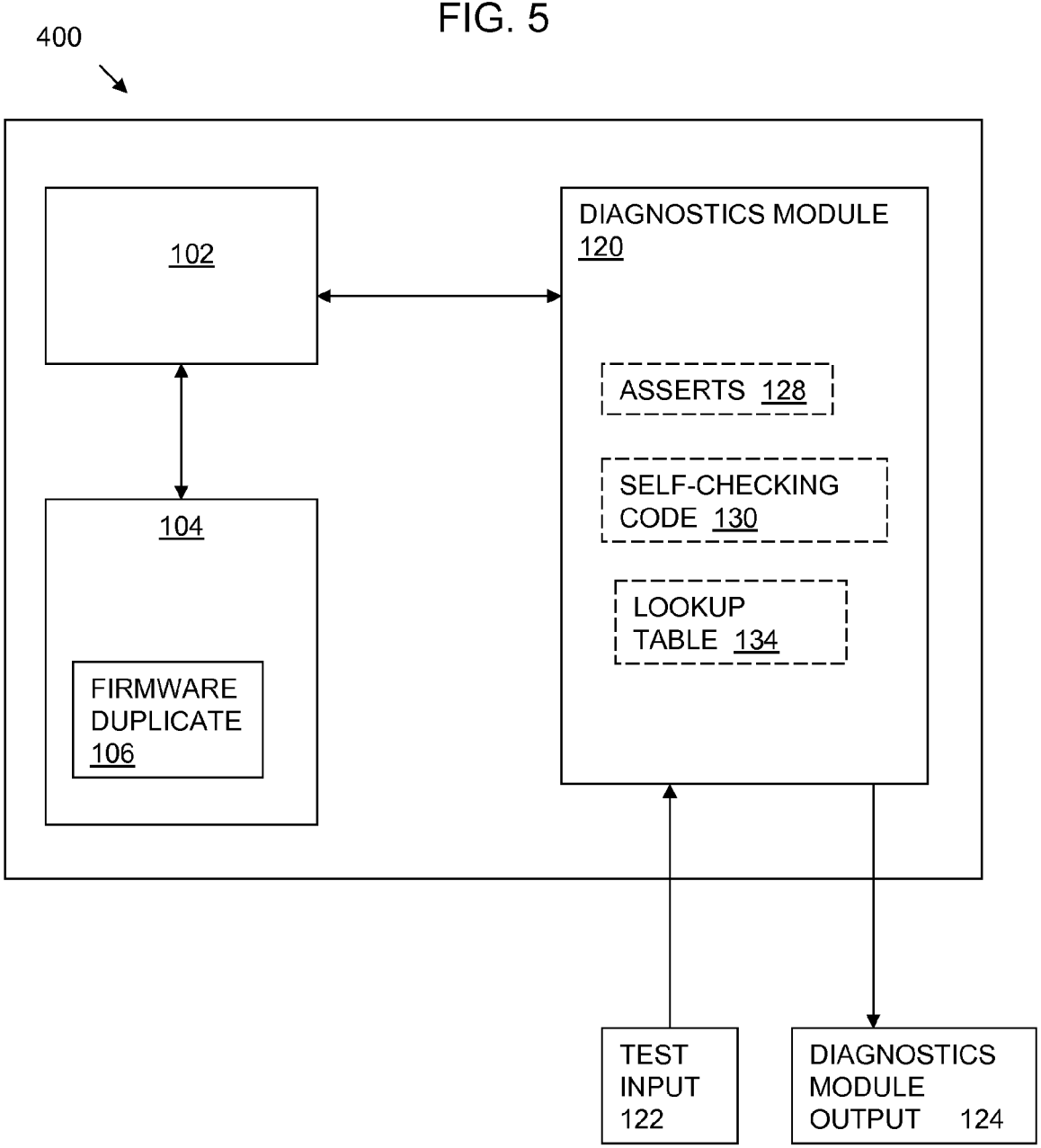
FIG. 5 is a block diagram of a system associated with an embodiment of the present invention.

Embodiments of the invention may also include a diagnostics module 120. Turning now to FIG. 5, embodiment 400 includes modules 102 and 104, including firmware duplicate 106. The diagnostics module 120 is configured to accept test input 122 and to determine whether the configuration module 102 performs according to expectations. The results of this operation are outputted as diagnostics module output 124. For example, the diagnostics module 120 may be used to test the correctness of precompiler conditional directives.

Figure 2:
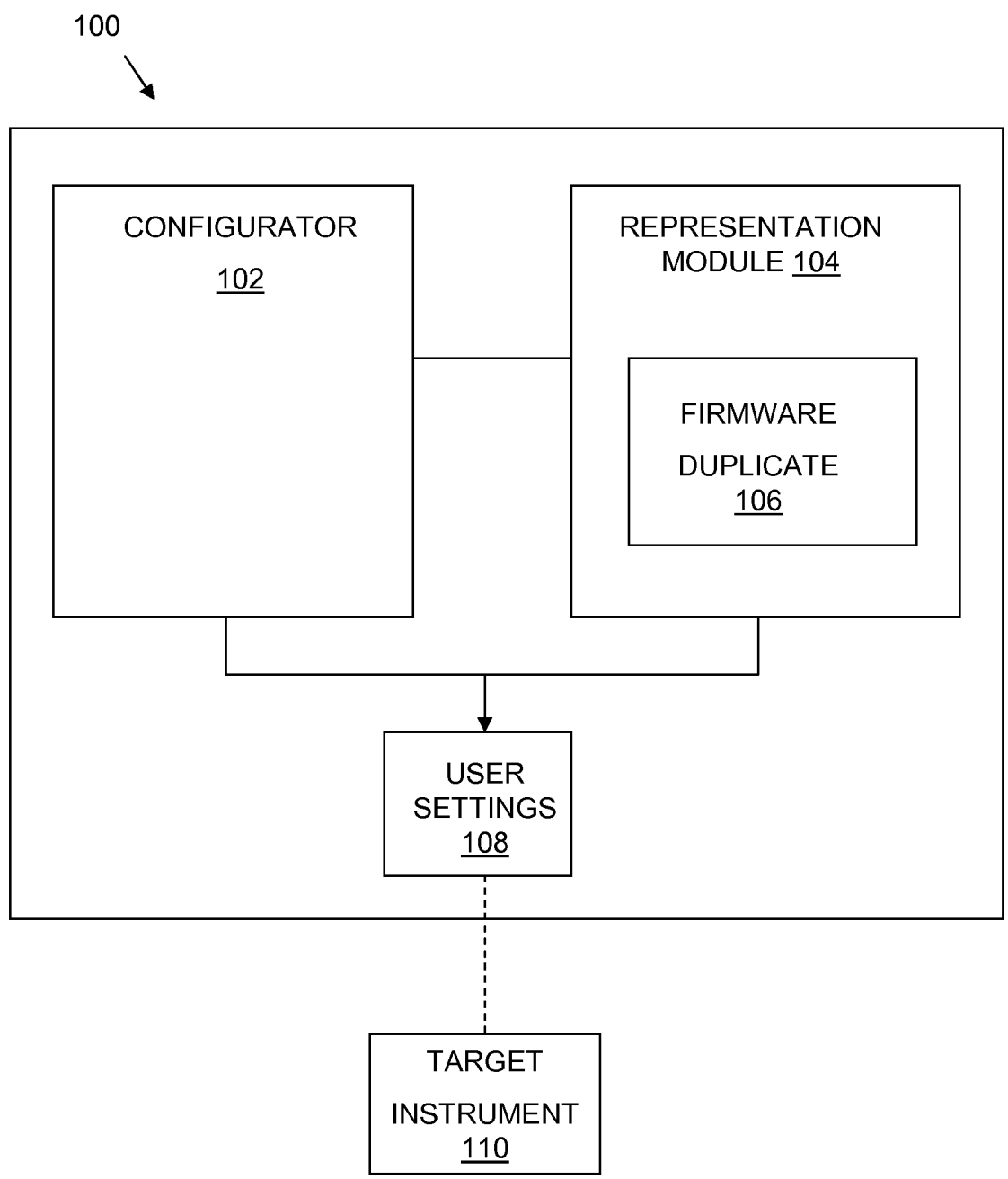
FIG. 2 is a block diagram of a system associated with an embodiment of the present invention.

Diagnostics module 120 may operate in substantially any manner known to those skilled in the art, in light of the teachings of the present invention. For example, diagnostics module 120 may include a lookup table 134 of expected outputs for various test inputs 122 in the form of user setting configurations for a particular target device 110 (FIGS. 2, 3). If the actual output generated by module 102 in response to the test inputs 122 does not correspond to the expected output, then the developer will know, via output 124, that the configuration module 102 is not operating as expected.

Output 124 may be in the form of messages indicating that a particular inputted configuration 108 is acceptable or unacceptable, based upon whether or not the particular configuration was found in the lookup table. Diagnostics module 120 may also include any number of algorithms, including expert systems, operable in combination with the target firmware, to identify any incompatibilities within the configuration inputted at 122. Output 124 may also optionally include an indication of the particular parameters and ranges thereof, etc., that the target device would be expected to generate based on the particular configuration inputted at 122.

The diagnostics module 120 may also be used for development of the configuration program to test for compatibility with both the instrument platform and the configurator platform. In this regard, diagnostics module 120 may optionally include an assertion module 128 configured to insert asserts, i.e., predicates (true-false statements) expected to be true, at strategic points in the codes of modules 102, 104. If an inserted assert is determined to be false during execution of these modules, then a problem with the coding may be exposed. The diagnostics module 120 may also include optional self-checking code module 130, which may be configured in a conventional manner for the discovery of invalid instructions.

The duplicate firmware 106 in these embodiments enables the diagnostics module 120 to operate as if it were communicably coupled to the target instrument. As discussed above, this is an improvement over simulators which rely upon a simulation of the target to be configured, because the simulation may not be entirely accurate. Because the first and second modules 102, 104, and the diagnostics module 120, operate as if an actual hardware instrument is attached, they enable a user to predict the outcome of various user setting combinations, as if they were implemented on the actual instrument.

Additional embodiments allow developers to produce virtual prototypes of a user settings menu, even before the physical instrument becomes available. Moreover, the menu prototypes may be conveniently transported without the actual target instrument, such as, for convenient collaboration with development and marketing partners.

Figure 6:
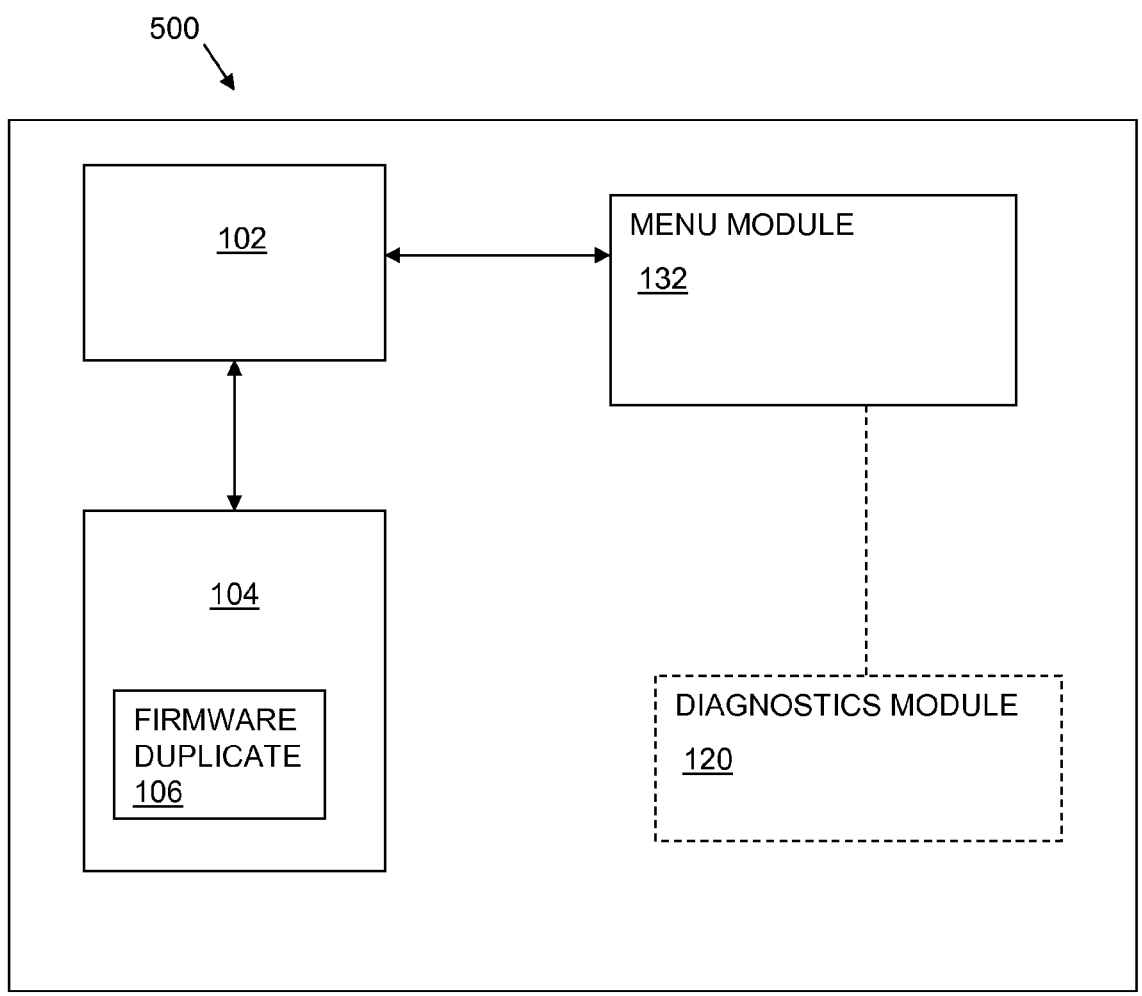
FIG. 6 is a block diagram of a system associated with an embodiment of the present invention.

Turning to FIG. 6, embodiment 500 includes modules 102 and 104, firmware duplicate 106, and menu prototype module 132. The menu prototype module 132 is configured to generate a menu, e.g., which serves as a graphical user interface (GUI) for choosing user settings. The module 132 allows developers and marketers to demonstrate options which would be available for the instrument user settings. Since the configuration module 102 acts as if an actual physical instrument were attached, by virtue of the firmware duplicate 106, the menu prototype would be a substantially accurate representation of what would be feasible for each target instrument.

Figure 7A:
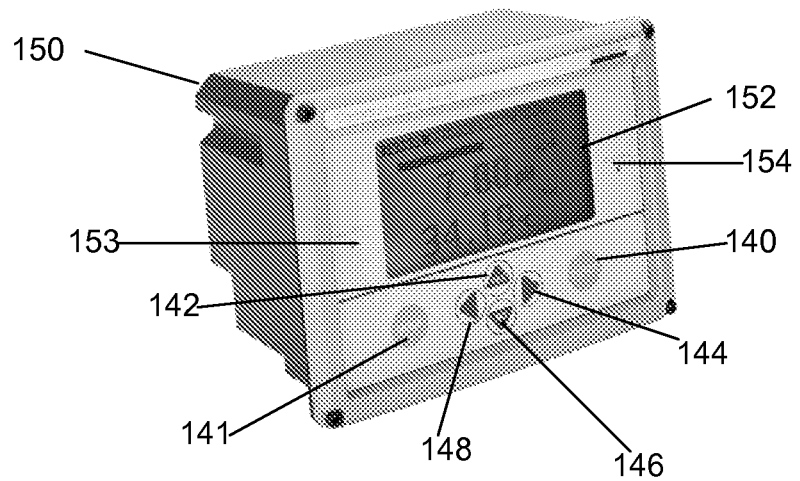
FIGS. 7A-B are diagrams of an aspect of various embodiments of the invention.
Figure 7B:
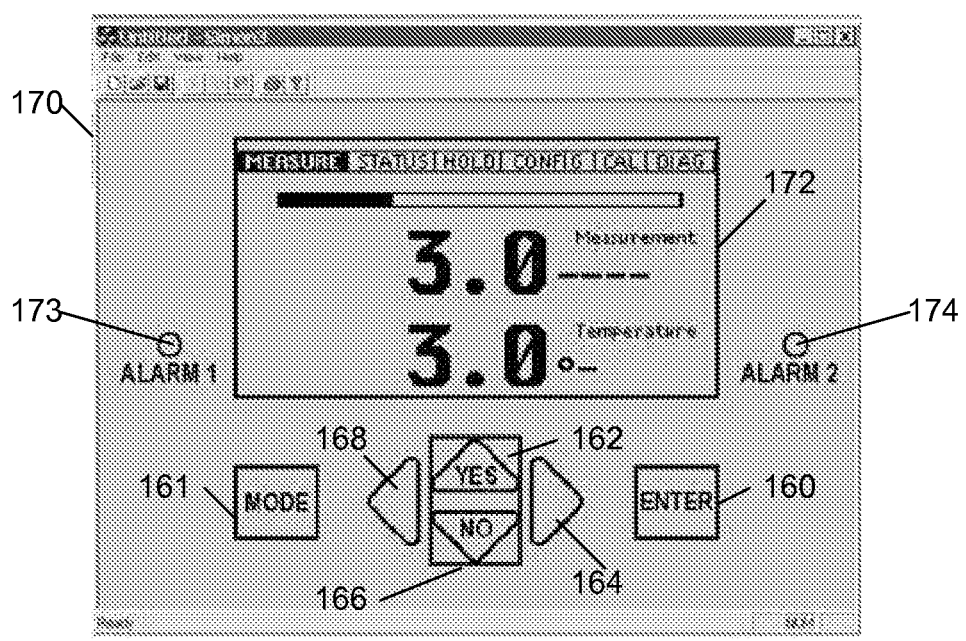

The representation module 104 may include software which enables the representation of a physical user interface on instrument 150 (FIG. 7A), such as buttons, as a virtual interface on display screen 170 (FIG. 7B). Since the virtual interface of the configurator platform is coupled to the firmware duplicate, the configuration settings as set up through the configurator interface operate as if they had been chosen through the instrument's physical interface.

Turning to the embodiments of FIGS. 7A and 7B, the physical interface of instrument 150 of FIG. 7A is represented on configurator screen display 170 of FIG. 7B. Aspects of the firmware duplicate 106 of FIGS. 2, 3, 5, and 6 are transformed to the representation 170 of FIG. 7B. Enter button 140 of the instrument 150 is represented as button 160 on the configurator screen display 170. In this embodiment, up button 142, right button 144, down button 146, and left button 148 of instrument 150 are represented on the configurator interface 170 as up button 162, right button 164, down button 166, and left button 168, respectively. Alarm indicators 153, 154 of instrument 150 are represented in the configurator interface 170 as alarm indicators 173 and 174.

Although the physical buttons and virtual buttons serve similar functions, they may optionally have somewhat different appearances. A virtual button may have a different shape than its physical counterpart. Virtual buttons may also be disposed at somewhat different locations than their physical counterparts. For example, virtual buttons may be disposed adjacent to one another, even though their physical counterparts may be spaced apart, to facilitate physical pushing.

Accordingly, the various embodiments of the claimed invention provide an efficient, substantially accurate set of user settings for a target instrument, which may be implemented on the target instrument, nominally without further adjustments. Embodiments of the invention also include provisions for generating a virtual menu prototype, which provides an accurate representation of available configuration options for a target instrument, independently of an actual instrument, and/or before the physical instrument itself becomes available. In addition, embodiments of the invention provide a diagnostics environment, which is configured to alert a user to potential problems with operation of the configuration and representation modules, and/or with proposed menu prototypes, e.g., prior to downloading the settings to an actual target instrument.

It should be noted that the various modules and other components of the embodiments discussed hereinabove may be configured as hardware, as computer readable code stored in any suitable computer usable medium, such as ROM, RAM, flash memory, phase-change memory, magnetic disks, etc., and/or as combinations thereof, without departing from the scope of the present invention.

It should be further understood that any of the features described with respect to one of the embodiments described Having described the invention, what is claimed is:

1. A non-transitory computer-readable medium including computer-executable instructions carried out by a computer system implementing a customization system for customization of user settings on a target instrument in a process control system, comprising:
   a configuration module running on a platform;
   a representation module communicably coupled to said configuration module, said representation module including a firmware duplicate including a copy of at least a portion of firmware from the target instrument;
   wherein said representation module is configured to transform the firmware duplicate into a representation of at least a portion of a physical target instrument, and wherein the firmware duplicate is operable off-line from the process control system as if the firmware duplicate were communicably coupled to the target instrument;
   the firmware being compliant with communication protocols selected from the group consisting of HART®, FOXCOM®, PROFIBUS™, FOUNDATION™ FIELDBUS, and MODBUS, RS232, RS 485, DEVICENET™, CONTROLNET™, CAN™, ZIGBEE™ (IEEE 802.15.4), Ethernet/IP, DH+, Intranet, and combinations thereof;
   a hardware adaptation module for adapting the firmware duplicate to the specific hardware requirements of the platform on which the configuration module is running, said hardware adaptation module comprising one or more conditional preprocessor directives enabling the execution of alternate code for different platforms;
   a menu module configured to generate prototypes of a user menu for the target instrument; and
   a diagnostics module configured to perform an operation selected from the group consisting of: confirming proper operation of said configuration module; confirming proper configuration of a customized set of user settings; and confirming proper configuration of a menu prototype for the target instrument, and combinations thereof, said diagnostic module comprising an assertion module, said assertion module inserting predicate assertions into the code of the configuration module and the representation module at strategic points to expose problems in the code of the configuration module and the representation module during execution;
   wherein said system is configured to generate the customized set of user settings for the target instrument running on a second platform, independently of any connection to the target instrument, which user settings are capable of being used by the target instrument without further modification.

2. A non-transitory computer-readable medium including computer-executable instructions carried out by a computer system implementing a customization system for customization of user settings on a target instrument, comprising:
   a configuration module running on a platform;
   a representation module running on the platform, said representation module being communicably coupled to said configuration module, said representation module including a firmware duplicate including at least a portion of firmware of the target instrument;
   a hardware adaptation module for adapting the firmware duplicate to the specific hardware requirements of the platform on which the configuration module is running, said hardware adaptation module comprising one or more conditional preprocessor directives enabling the execution of alternate code for different platforms; and
   a diagnostics module for determining whether one or more other modules perform according to expectations, said diagnostics module comprising an assertion module, said assertion module inserting predicate assertions into the code of the configuration module and the representation module at strategic points to expose problems in the code of the configuration module and the representation module during execution;
   wherein said representation module is configured to transform the firmware duplicate into a representation of at least a portion of a physical target instrument, and wherein the firmware duplicate is operable off-line from the target instrument as if the firmware duplicate were communicably coupled to the target instrument; and
   wherein said system is configured to generate a customized set of user settings for the target instrument running on a second platform based at least on a portion of firmware included in the firmware duplicate such that said customized set of user settings are capable of being used by the target instrument without further modification.

3. The non-transitory computer-readable medium of claim 2, wherein said configuration module comprises computer readable code on computer readable media.

4. The non-transitory computer-readable medium of claim 2, wherein said representation module comprises computer readable code on computer readable media.

5. The non-transitory computer-readable medium of claim 2, wherein said representation module is embedded within said configuration module.

6. The non-transitory computer-readable medium of claim 2, wherein the firmware duplicate comprises hardware adaptation code, the hardware adaptation code including instructions configured for adapting the firmware duplicate to specific hardware requirements of a host computer on which the configuration module is running.

7. The non-transitory computer-readable medium of claim 2, wherein the firmware duplicate comprises a copy of about 50% of the firmware from the target instrument.

8. The non-transitory computer-readable medium of claim 2, wherein the firmware duplicate comprises a copy of about 80-90% of the firmware from the target instrument.

9. The non-transitory computer-readable medium of claim 2, wherein the firmware of the target instrument is compliant with communication protocols selected from the group consisting of HART®, FOXCOM®, PROFIBUS™, FOUNDATION™ FIELDBUS, and MODBUS®, RS232, RS 485, DEVICENET™, CONTROLNET™, CAN™, ZIGBEE™ (IEEE 802.15.4), Ethernet/IP, DH+, Intranet, and combinations thereof.

10. The non-transitory computer-readable medium of claim 2, wherein the system is configured for running on a standalone computer.

11. The non-transitory computer-readable medium of claim 2, wherein the representation of at least a portion of a physical target instrument comprises a visual representation.

12. The non-transitory computer-readable medium of claim 2, wherein the target instrument comprises a field device in a process control system.

13. The non-transitory computer-readable medium of claim 12, wherein the field device comprises a single variable transmitter.

14. The non-transitory computer-readable medium of claim 12, wherein the field device comprises a multivariable transmitter.

15. The non-transitory computer-readable medium of claim 2, wherein the customized set of user settings are configured for use by the target instrument.

16. The non-transitory computer-readable medium of claim 2, wherein said diagnostics module comprises computer readable code on computer readable media.

17. The non-transitory computer-readable medium of claim 2, wherein said diagnostics module is configured to confirm proper operation of said configuration module.

18. The non-transitory computer-readable medium of claim 2, wherein said diagnostics module is configured to generate a prototype user menu.

19. The non-transitory computer-readable medium of claim 2, wherein said diagnostics module is configured to generate a prototype for the target instrument.

20. A method of customizing user settings on a target instrument, comprising:
a) providing a configuration module for customizing user settings on a target instrument;
b) providing a representation module with a duplicate of firmware of the target instrument, wherein the duplicate of firmware is operable off-line as if the duplicate of firmware were communicably coupled to the target instrument;
c) providing a hardware adaptation module for adapting the firmware duplicate to the specific hardware requirements of a platform on which the configuration module is running, said hardware adaptation module comprising one or more conditional preprocessor directives enabling the execution of alternate code for different platforms;
d) providing a diagnostics module for determining whether one or more other modules perform according to expectations, said diagnostics module comprising an assertion module, said assertion module inserting predicate assertions into the code of the configuration module and the representation module at strategic points to expose problems in the code of the configuration module and the representation module during execution;
e) communicably coupling the representation module to the configuration module; and
f) actuating the configuration and representation modules to generate a customized set of user settings for the target instrument capable of being used by the target instrument without further modification.

21. The method of claim 20, wherein said communicably coupling c) comprises embedding said representation module in said configuration module.

22. The method of claim 20, wherein the target instrument comprises a field device in a process control system.

* * * * *